United States Patent [19]
Baker et al.

[11] Patent Number: 5,137,069
[45] Date of Patent: Aug. 11, 1992

[54] DRAG RACING TIRE

[76] Inventors: Jan B. Baker, Rte. 4 Box 108; Richard M. Oliver, 714 Waters St., both of Glennville, Ga. 30427

[21] Appl. No.: 655,820

[22] Filed: Feb. 15, 1991

[51] Int. Cl.$^5$ .................................. B60C 3/04
[52] U.S. Cl. .................................. 152/454
[58] Field of Search .................. 152/209 R, 454; D12/135, 152

[56] References Cited

U.S. PATENT DOCUMENTS 4,811,771  3/1989  Shoemaker et al. ............... 152/454

OTHER PUBLICATIONS

"Tire & Rim 1992 Yearbook" Tire & Rim Ass. 1992.
"Drag Racing" by Terolyn Nentl; 1978; pp. 12, 18, and 22.
"Speed! Indy Car Racing" by Jezierski; 1985 pp. 70, 123, 139.
Mickey Thompson Competitor; "Hot Rod" May 1990, p. 50.
Goodyear Eagle Gatorback; "Hot Rod" May 1990, p. 51.

Primary Examiner—Michael W. Ball
Assistant Examiner—Nancy Krawczyk

[57] ABSTRACT

The ratio of the tire sidewall measured diametrically through the center is such with respect to the diameter of the wheel on which the tire is mounted that tire growth is reduced. The wheel diameter is larger than conventional drag racing tire wheels and the sidewall dimension is less while the diameter of the tire and the tread width remains substantially unchanged.

6 Claims, 2 Drawing Sheets

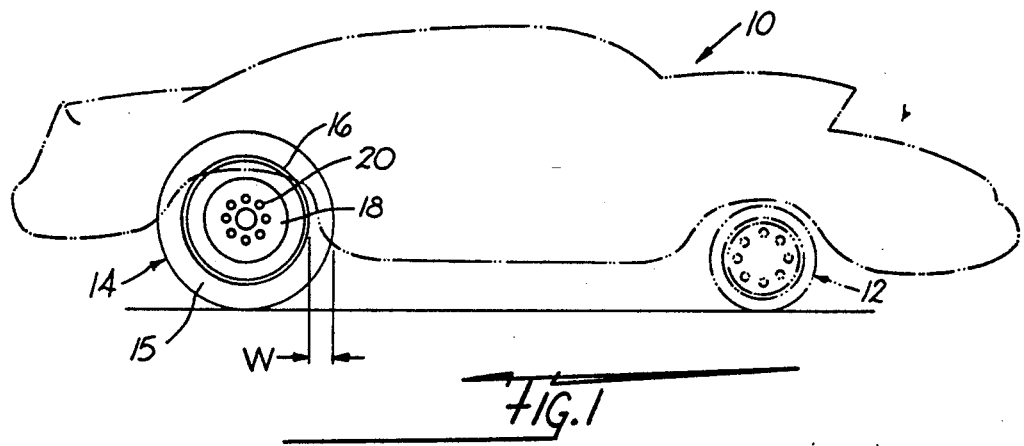
Fig. 1
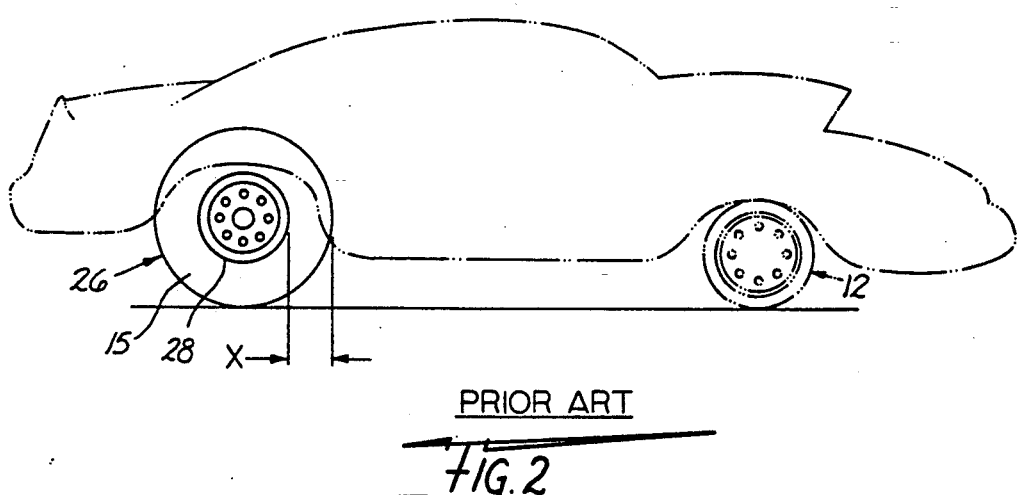
PRIOR ART
Fig. 2
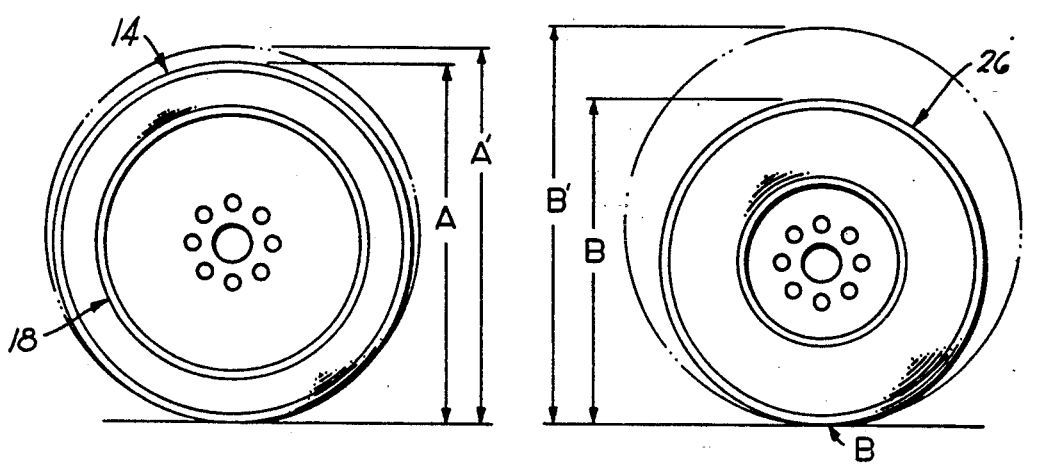
Fig. 3
PRIOR ART
Fig. 4

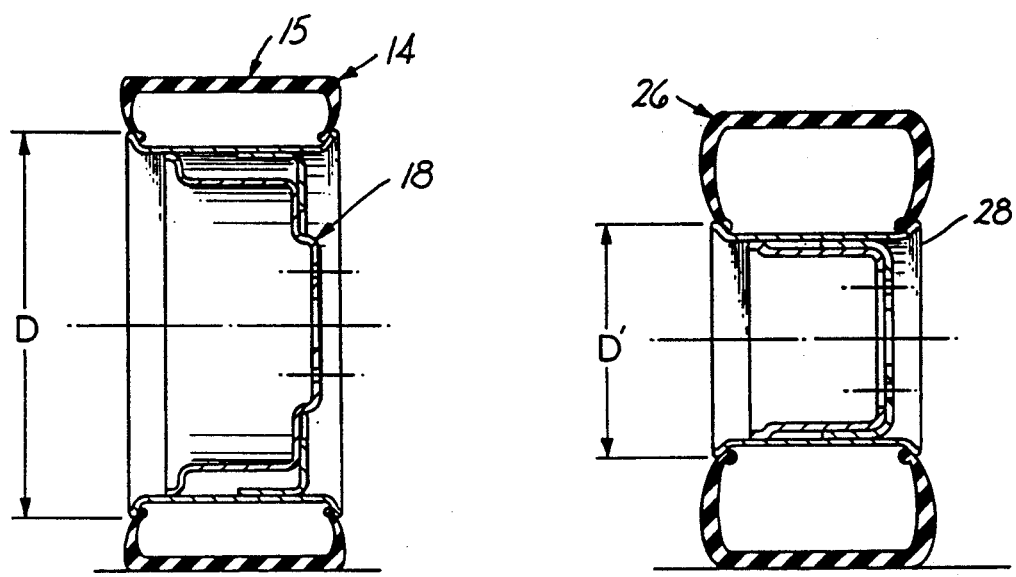
FIG. 5
FIG. 6 PRIOR ART
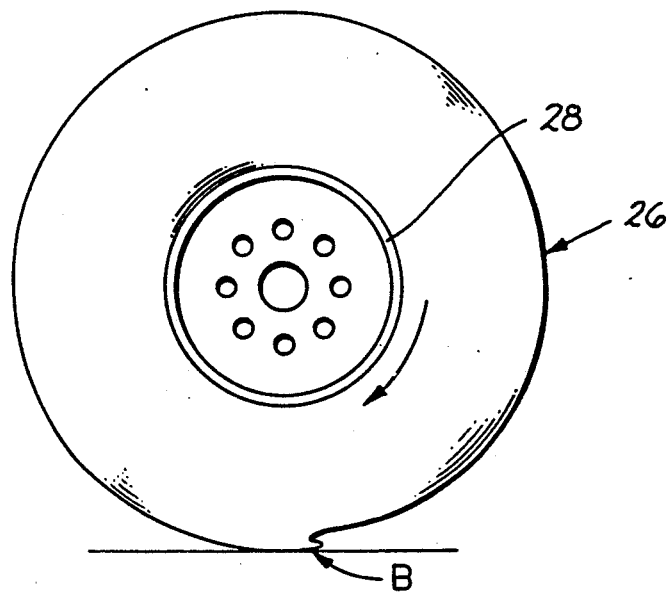
FIG. 7 PRIOR ART

DRAG RACING TIRE

BACKGROUND OF THE INVENTION

1. Field of the Invention

The sidewall of a tire is lessened by increasing the wheel diameter while leaving the outside diameter of the tire and the tread width more or less standard for use to improve the performance in drag racing.

2. Discussion of the Prior Practices

Drag racing is a motor sport which involves rapid acceleration from a standing start. The drag racing vehicle has two rear wheels on which is mounted a tire which can be a low profile tubeless tire. A considerable amount of power from the vehicle engine is applied suddenly to the rear wheels which is transferred by torque to the profile face of the tire in engagement with the pavement. Ordinary low profile tires are made by maintaining the same wheel diameter while lessening the outside diameter of the tire and increasing the tire width. In the prior drag racing tires one major problem is tire growth which is a type of distorted enlargement of the tire due to the excess sidewall so that as speed increases the tire gets narrower and taller. Both cause tremendous instability at speed and tremendous instability while slowing down. Tire growth causes speeds that alarm insurance companies. The second major problem is tire shake which is when the tire face sticks to the track so tight that the sidewall flexes and wads-up causing the tire to be stretched out of shape whereby the tire runs over itself. The present improved drag racing tire present lesser sidewall of the tire than the prior drag racing tires by increasing the wheel diameter while maintaining substantially the outside diameter and face width of the tire. Thus there is presented a low profile tire in a different way than ever before whereas prior tires maintained the same wheel diameter but lessened the outside diameter of the tire and increased the width.

One object of the present invention is to reduce tire shake by reducing sidewall and preventing growth while presenting enough sidewall to allow it flexibility.

This concept is not an adaptation of an old idea but rather is a "new" tire and wheel combination which is not currently known or in production.

SUMMARY OF THE INVENTION

A drag racing tire has a reduced dimension of the sidewall of the tire and is mounted on a wheel diameter of larger size than prior drag racing wheels but with an outside diameter of the tire and tread width substantially the same. Tire shake has been reduced by reducing tire growth which is the enlargement of the tire diameter during speed.

BRIEF DESCRIPTION OF THE FIGURES OF THE DRAWING

FIG. 1 is a side elevation view of a typical drag racing vehicle in phantom lines having tires of the present invention mounted on the rear.

FIG. 2 is a side elevation view of the vehicle in FIG. 1 with rear tires made in accordance with the prior art.

FIG. 3 is a side elevation view of the tire in FIG. 1 illustrating in phantom lines approximate tire growth that would occur during use and speed.

FIG. 4 is a side elevation view of the "prior art" tire in FIG. 2 illustrating in phantom lines tire growth which occurs during use and speed.

FIG. 5 is a vertical cross-sectional view of the tire shown in FIG. 1 illustrating the approximate ratio between the diameter of the tire and the diameter of the rim.

FIG. 6 is a vertical cross-sectional view of the tire shown in FIG. 4 illustrating the approximate ratio between the diameter of the tire and the diameter of the rim.

FIG. 7 a side elevation view of the prior art tire shown in FIG. 4 illustrating how a prior art tire stretches out of shape and runs over itself.

DESCRIPTION OF A PREFERRED EMBODIMENT

In FIG. 1 a typical drag vehicle 10 is shown in phantom lines and per se does not form any part of this invention because there are many different vehicles which may be used for drag racing. Vehicle 10 has removable front tires 12 on the front on each side thereof and removable rear tires 14 on each side of the rear thereof. Tires 14 are removably mounted on a respective wheel 16 which includes a wheel rim 18 which is shown in cross section in FIG. 5. Wheel 16 is held in place by removable lug nuts 20 threaded onto threaded shafts circumferentially placed and attached to the rear drive shaft of the vehicle which is not shown.

Tire 14 has a face 15 and a sidewall width W measured from the circumference of wheel 16. The vehicle 10 in FIG. 2 is fitted with prior art tires 26 of conventional construction shown in cross-section in FIG. 6. The tire diameter B of the prior art tire 26 is substantially the same as the tire diameter A as the tire 14, however the prior art tire 26 is mounted on a wheel 26 with a diameter smaller than the wheel 18 of the current invention. The prior art tire 26 therefor is defined by a wider sidewall X. Of course, the dimension of the sidewalls W and X will vary somewhat depending upon amount of air inside the tire. For example, a 3.5 inch sidewall is too small to work. The tire 14, for example, has a diameter A of about 31–37 inches and is mounted on a wheel 18 with a diameter D of about 20–25 inches. Whereas the prior art tire 26, as shown in FIG. 6, with diameter B of about 36 inches is mounted on a wheel 26 with a diameter of about 16 inches and has a sidewall dimension X of about 10 inches. Both tires have a width of about 17 inches on the face. The tire ratio of the overall tire diameter to the wheel diameter for the tire 14 of the invention is approximately 1.5 whereas the tire ratio for the prior are tire 26 is approximately 2.25.

As seen FIGS. 2, 3 and 4, the present tire sidewall increases less in size during movement than the corresponding larger side wall of the prior art tire 26 in FIG. 2. The comparison of the growth of the two tires between FIGS. 3 and 4 illustrated by the phantom lines in each Fig. which capital A represents the normal diameter of the tire and wheel during rest whereas A' represents the approximate growth of the tire during movement which is considerably less than the growth shown in the prior art tire shown in FIG. 4 between the normal diameter B and the larger growth B' during acceleration and speed. In addition, in the prior art tire 26 in the FIGS. 4 and 7 the tire 26 stretches out of shape and distorts at the bottom B in such a way that the tread of the tire runs over itself and doubles at the bottom causing tire shake. As the speed increases in the prior art tire 26 the tire 26 gets narrower and taller and such growth causes tremendous instability during speed and also while slowing down. Depending on the car, the engine, the suspension "set up" there is no sidewall W too large to work. The tire 14 allows the engine to put more power to the track without over-powering the tire 14 and causing it to shake.

While there is shown and described a particular embodiment of this invention together with a suggested mode of operation as well as a comparison with the prior art tires, this is by way of illustration and does not constitute any limitation on the scope of this invention because there are various modifications, changes, illuminations and variations which may be made in the preferred embodiment without departing from the scope of this invention as defined only by a proper interpretation of the appended claims.

What is claimed:

1. A drag racing tire and wheel combination wherein the tire ratio of the overall time diameter (A) to the overall wheel diameter (D) is approximately 1.5, the overall tire diameter (A) ranges from 31 to 37 inches, the overall wheel diameter (D) ranges from 20 to 25 inches.

2. The drag racing tire and wheel combination of claim 1 wherein the tire width is equal to or less than 17 inches.

3. The drag racing tire and wheel combination of claim 1 wherein the overall tire diameter (A) is 36 inches, the overall wheel diameter (D) is 24 inches, and the tire width is 17 inches.

4. A drag racing tire wherein the tire ratio of the overall tire diameter (A) to the overall bead diameter is approximately 1.5, the overall tire diameter (A) ranger from 31 to 37 inches, and the bead diameter ranges from 20 to 25 inches.

5. The Drag Racing tire of claim 4 wherein the tire width is equal to or less than 17 inches.

6. The Drag Racing tire of claim 4 wherein the overall tire diameter is 36 inches, the tire bead diameter is approximately 24 inches and the tire width is 17 inches.

* * * * *